US009889491B2

(12) United States Patent
Flöth et al.

(10) Patent No.: US 9,889,491 B2
(45) Date of Patent: Feb. 13, 2018

(54) METHOD FOR PRODUCING A SEAMLESS PRESSURE VESSEL FOR STORING HYDROGEN

(71) Applicant: THYSSENKRUPP STEEL EUROPE AG, Duisburg (DE)

(72) Inventors: Thomas Flöth, Duisburg (DE); Thomas Großerüschkamp, Duisburg (DE); Lothar Patberg, Moers (DE); Andreas Cott, Waltershausen (DE); Henrik Sage, Ludwigsburg (DE); Jörg-Wendelin Sauer, Dresden (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 181 days.

(21) Appl. No.: 14/623,784

(22) Filed: Feb. 17, 2015

(65) Prior Publication Data
US 2015/0231684 A1 Aug. 20, 2015

(30) Foreign Application Priority Data

Feb. 17, 2014 (DE) ........................ 10 2014 101 972

(51) Int. Cl.
*B21D 51/26* (2006.01)
*B21D 51/24* (2006.01)

(52) U.S. Cl.
CPC ............ *B21D 51/26* (2013.01); *B21D 51/24* (2013.01)

(58) Field of Classification Search
CPC ...... B21D 51/24; B21D 51/26; B29C 70/086; B29C 70/088; F17C 2209/00; F17C 2209/21; F17C 2209/2109; F17C 2209/23
See application file for complete search history.

(56) References Cited

U.S. PATENT DOCUMENTS

| 2,744,043 A | 5/1956 | Ramberg |
| 3,861,883 A | 1/1975 | Uto et al. |

(Continued)

FOREIGN PATENT DOCUMENTS

| AT | 317273 B | 8/1974 |
| CN | 1427800 A | 7/2003 |

(Continued)

OTHER PUBLICATIONS

English Translation of abstract of JP 61-123496 (A).

(Continued)

*Primary Examiner* — R. K. Arundale
*Assistant Examiner* — Pradeep C Battula
(74) *Attorney, Agent, or Firm* — Thyssenkrupp North America, Inc.

(57) ABSTRACT

A method may be used to produce a seamless pressure vessel for storing hydrogen. So that such a pressure vessel withstands both very high internal pressures and pressure fluctuations and (low) temperatures and temperature fluctuations and also high mechanical loading, is resistant to embrittlement, and is comparatively lightweight, a round or tubular workpiece may be formed that includes a multi-layer composite sheet metal material comprising a carrier layer made of steel material and a shielding layer resistant to hydrogen embrittlement by a flow forming process into a seamless hollow body, which serves as a semifinished product to be further processed into the seamless pressure vessel. The shielding layer may represent an inner layer of the pressure vessel. During the flow forming of the workpiece, the shielding layer may be retained as a whole-area, uninterrupted layer.

6 Claims, 4 Drawing Sheets

(56) References Cited

U.S. PATENT DOCUMENTS

| | | | |
|---|---|---|---|
| 5,004,120 A | 4/1991 | Hembert | |
| 6,946,176 B2 * | 9/2005 | Jousse | B32B 27/08 428/332 |
| 7,219,812 B2 * | 5/2007 | Debecker | F16J 12/00 220/588 |
| 2003/0167923 A1 | 9/2003 | Grote | |
| 2005/0166992 A1 | 8/2005 | Yokota et al. | |
| 2005/0258575 A1 * | 11/2005 | Kruse | B29C 70/086 264/512 |
| 2006/0099366 A1 * | 5/2006 | Takemoto | B29C 70/088 428/36.1 |
| 2009/0095796 A1 * | 4/2009 | Prakash | F17C 1/06 228/184 |
| 2010/0122747 A1 | 5/2010 | Blencoe | |

FOREIGN PATENT DOCUMENTS

| | | |
|---|---|---|
| CN | 101187441 A | 5/2008 |
| CN | 101881371 A | 11/2010 |
| CN | 102011933 A | 4/2011 |
| DE | 3910192 A1 | 9/1990 |
| DE | 19711844 B4 | 6/2005 |
| DE | 102006039656 B4 | 12/2008 |
| DE | 20 2009 008 026 U1 | 10/2010 |
| DE | 10 2007 020 027 B4 | 10/2012 |
| DE | 10 2011 105 426 B4 | 3/2013 |
| DE | 10 2011 105 423 B4 | 4/2013 |
| EP | 0398827 A1 | 11/1990 |
| GB | 1342448 A | 1/1974 |
| JP | 61-123496 A | 6/1986 |
| JP | 2003222299 A | 8/2003 |

OTHER PUBLICATIONS

English Translation of abstract of DE 102006039656 (B4).
English language Abstract for DE 3910192 A1 listed above.
English language Abstract for DE 19711844 B4 listed above.
English language Machine translation for DE 20 2009 008 026 U1 listed above.
English language Abstract for DE 10 2011 105 423 B4 listed above.
English language Abstract for DE 10 2011 105 426 B4 listed above.
English language Abstract for DE 10 2007 020 027 B4 listed above.
English language Abstract for CN 101187441 A listed above.
English language Abstract for CN 102011933 A listed above.
English language Abstract for CN 101881371 A listed above.

* cited by examiner

METHOD FOR PRODUCING A SEAMLESS PRESSURE VESSEL FOR STORING HYDROGEN

FIELD

This disclosure relates to a method for producing a seamless pressure vessel for storing hydrogen and also to such a pressure vessel produced by the method.

BACKGROUND

In order to make it possible to efficiently utilize hydrogen as an energy carrier, suitable storage of the gas is important. This requires cost-effective, lightweight vessels which are suitable for mass production and which on the one hand withstand particularly high pressures and pressure fluctuations as well as (low) temperatures and temperature fluctuations and on the other hand are protected from the reactivity of the hydrogen gas. In addition, the pressure vessels, also referred to as pressurized gas vessels, have to reliably withstand external mechanical loading.

In order to make it possible to efficiently utilize hydrogen as an energy source, it is necessary for large quantities of the gas to be stored in a small space. Minimization of the space required for storing the gas simultaneously correlates to an increase in the internal pressure. The increase in the internal pressure and associated large pressure fluctuations increase the demands made in respect of the mechanical stability of the pressure vessels considerably.

Mechanical damage to the pressure vessels from the outside is very dangerous and therefore has to be avoided without fail. The demands made on the pressure vessels also increase with a view to this aspect, in particular with the increase in the internal pressure. Moreover, it should be possible to dispense with complex containments, as would be necessary for preventing damage caused, for example, by accidents (vehicle collisions) or bombardment.

The microstructure of uncoated steel materials can be negatively affected/altered by the penetration of hydrogen into the material. In this respect, reference is made in particular to what is termed hydrogen embrittlement. Through alternating changes in load, for example large fluctuations of the internal pressure in a hydrogen gas tank, this can lead to an increased extent to material failure. Protection by a conventional surface coating, for instance a lacquer coating or a metallic covering through, for example, zinc plating, cannot permanently prevent hydrogen from attacking the microstructure of carbon steel or low-alloyed steel.

It is known from the prior art to produce vessels for storing hydrogen from a plurality of layers, to be precise from an inner layer made of a high-grade steel alloy and an outer layer made of carbon steel or low-alloyed steel (see JP 61-123 496 A).

Furthermore, it is known to produce pressurized gas vessels from a round sheet metal workpiece by means of a flow forming machine (see DE 10 2006 039 656 B4). For this purpose, use is made of "monolithic" materials such as carbon steel, CrNi steel or (at low pressures) also aluminum.

SUMMARY

Against this background, disclosed herein is a method for producing a seamless pressure vessel for storing hydrogen, by means of which lightweight pressure vessels which withstand both very high internal pressures and pressure fluctuations, as well as (low) temperatures and temperature fluctuations, and also high mechanical loading from the outside, and moreover is resistant to embrittlement and can be produced cost-effectively.

BRIEF DESCRIPTION OF THE DRAWINGS

The present invention is described in detail below with reference to the attached drawing figures, wherein.

DETAILED DESCRIPTION

Figure 1:
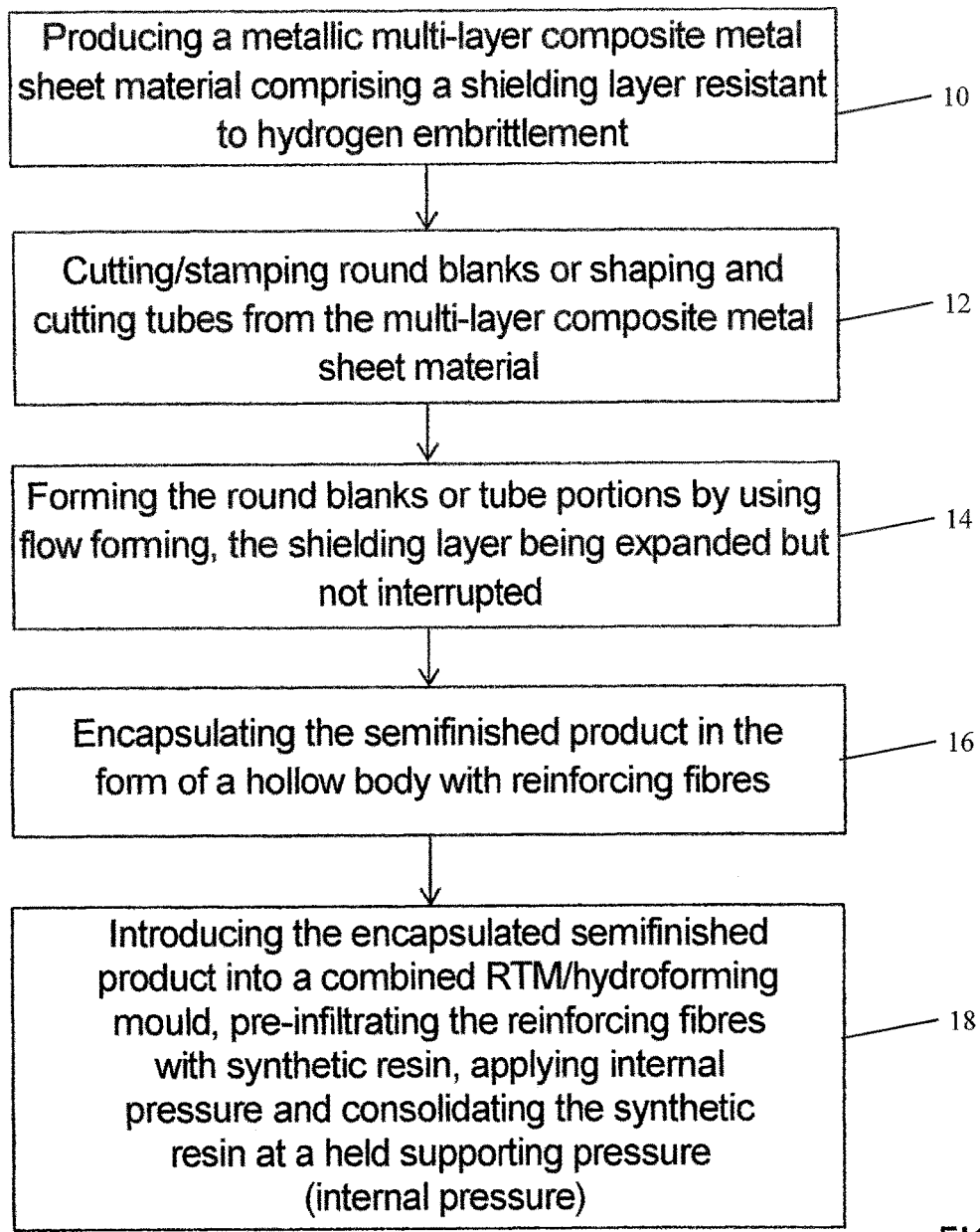
FIG. 1 is a flow chart depicting a sequence of steps in a first embodiment of a method of the present disclosure.

As disclosed herein, a seamless pressure vessel for storing hydrogen is produced by forming a round or tubular workpiece consisting of a multi-layer composite sheet metal material comprising a carrier layer made of steel material, preferably carbon steel, and a shielding layer resistant to hydrogen embrittlement by a flow forming process into a seamless hollow body, which serves as a semifinished product to be further processed into the seamless pressure vessel. In the process, the workpiece is formed in such a manner that the shielding layer represents an inner layer of the pressure vessel. In addition, the multi-layer composite sheet metal material or the workpiece is selected or produced according to the invention with respect to the thickness of the shielding layer in such a way that, during the flow forming of the workpiece, the shielding layer is retained as a whole-area, uninterrupted layer.

By employing the method according to the invention, it is possible to cost-effectively produce seamless pressure vessels for storing hydrogen which, with a relatively low weight, withstand both very high internal pressures and pressure fluctuations and also high mechanical loading from the outside and in addition are resistant to hydrogen embrittlement.

The metallic multi-layer composite sheet metal material used for carrying out the method according to the invention can be produced, for example, by hot roll cladding. CrNi steel, for example, can be used for the shielding layer (hydrogen barrier) which is resistant to hydrogen embrittlement and serves as the inner layer of the pressure vessel.

An advantageous configuration of the method according to the invention provides that the carrier layer of the multi-layer composite sheet metal material consists of hardenable steel material, preferably of hardenable carbon steel material, and that the semifinished product is heated and then hardened by quenching by means of a cooling fluid. The use of hardenable carbon steel material and the hardening thereof increases the resistance of the pressure vessel to external mechanical loading. If appropriate, the hardening of the pressure vessel makes it possible to achieve a reduction in the thickness of the carrier layer of the multi-layer composite sheet metal material to be formed by the flow forming and therefore a reduction in the weight of the pressure vessel thus produced.

In this context, it also lies within the scope of the method according to the invention for the hardened semifinished product to be heat-treated (if appropriate) in order to set a relatively low hardness. This heat treatment involves what is termed tempering. In the merely quenched state, the steel is occasionally very hard and brittle and not always optimal for the use in question here. Through the optional tempering of the hardened carbon steel material, the hardness thereof can be reduced and the desired use properties of the steel, in particular the tensile strength, ductility and hardness thereof, can be set. The higher the tempering temperature, the lower the hardness and the higher the ductility. By way of example, the tempering temperature lies in the range of 100-600° C., in particular in the range of 100-350° C.

Preferably, the semifinished product, in the form of a hollow body produced by flow forming, can be encapsulated with reinforcing fibers, for example comprising carbon, glass, basalt and/or aramid, and thereby reinforced. The semifinished product can be encapsulated with reinforcing fibers by being braided. In one embodiment, the reinforcing fibers used for reinforcing the pressure vessel may be dry, or alternatively pre-impregnated with a thermosetting and/or thermally curable plastic (synthetic resin). By way of example, according to a further configuration of the method according to the invention, a pre-impregnated fabric, in particular a mat, a woven fabric, a knitted fabric, a meshwork, a roving, a tape (in particular a strip) or a nonwoven fabric, made of reinforcing fiber for this purpose. As an alternative, however, at least one endless or continuous fiber (roving) or a fabric wound around the semifinished product can also be used as reinforcing for this purpose, wherein the endless fiber or the fabric is passed beforehand through an impregnation bath containing thermally curable synthetic resin. As an alternative, however, "dry" reinforcing fibers, which are not jet yet embedded in a plastic matrix, are used for encapsulating the pressure vessel. All of these variants of the method according to the invention make it possible to achieve a reliable and repeatable reinforcement of the semifinished product in the form of a hollow body or of the pressure vessel.

A further advantageous configuration of the method according to the invention is characterized in that the semifinished product is encapsulated (coated) with a thermosetting and/or thermally curable plastic (synthetic resin) and subjected to an internal pressure which is elevated compared to ambient pressure, with the plastic being consolidated or cured by holding the internal pressure, and in that the internal pressure is relieved after the plastic has been consolidated or cured, such that a lasting elastic prestress is generated in the pressure vessel produced from the semifinished product. This lasting prestress allows for higher internal pressures during later operation of the pressure vessel.

With respect to the above-mentioned reinforcement and calibration of the semifinished product or pressure vessel, a preferred configuration of the method according to the invention is characterized in that the semifinished product is introduced into a closable casting mold, in which the reinforcing fibers are pre-infiltrated with thermosetting plastic. In other words, thermosetting plastic resin is injected in the casting mold to form a layer surrounding the semifinished product and encapsulate the reinforcing fibers within the layer of plastic resin. The semifinished product encapsulated with the pre-infiltrated reinforcing fibers is then subjected to an internal pressure of more than 500 bar; preferably more than 1000 bar, by hydroforming in the casting mold, such that the plastic impregnates the reinforcing fibers and the semifinished product is formed (calibrated) in a plastic state into a final geometry of the pressure vessel. The internal pressure is relieved only after the plastic has been consolidated or cured, such that a lasting elastic prestress is generated in the pressure vessel. The lasting prestress allows for higher internal pressures during later operation of the pressure vessel.

Another advantageous variant of the method according to the invention is characterized in that reinforcing fibers pre-impregnated with thermosetting plastic are used as reinforcing fibers. The semifinished product encapsulated with the pre-impregnated reinforcing fibers is then in turn subjected to an internal pressure of more than 500 bar, preferably more than 1000 bar, by hydroforming, such that the semifinished product is formed (calibrated) in a plastic state into a final geometry of the pressure vessel. In a manner corresponding to the aforementioned configuration of the method, it is the case in this variant too that the internal pressure is relieved after the plastic has been consolidated or cured, such that a lasting elastic prestress is generated in the pressure vessel.

A further advantageous variant of the method according to the invention is characterized in that the semifinished product encapsulated with reinforcing fibers is introduced into a closable casting mold, in which the semifinished product is subjected to an internal pressure of at most 200 bar, with the reinforcing fibers being infiltrated with thermosetting plastic by holding the internal pressure, and wherein the internal pressure is relieved after the plastic has been consolidated or cured, such that a lasting elastic prestress is generated in the pressure vessel.

Yet another advantageous variant of the method according to the invention is characterized in that reinforcing fibers pre-impregnated with a thermosetting and/or thermally curable plastic are used as reinforcing fibers, and in that the semifinished product encapsulated with these reinforcing fibers is introduced into a mold, in which the semifinished product is subjected to an internal pressure of at most 200 bar and the plastic is cured by the supply of heat. In this variant, too, the internal pressure is relieved after the plastic has been consolidated or cured, such that a lasting elastic prestress is generated in the pressure vessel.

The present disclosure will be explained in further detail below with reference to the attached drawing figures showing various exemplary embodiments.

Referring to FIG. 1, a first exemplary embodiment of a method according to the present disclosure provides for the production or use of a metallic multi-layer composite sheet metal material comprising at least one carrier layer made of steel material, preferably carbon steel, and at least one shielding layer (hydrogen barrier) which is resistant to hydrogen embrittlement 10 and is made, for example, of CrNi steel. The multi-layer composite sheet metal material is produced, for example, by hot roll cladding.

Round blanks or tube portions are produced from this multi-layer composite sheet metal material 12. The round blanks are produced from the multi-layer composite sheet metal material by cutting and/or stamping. The tube portions can be produced from the multi-layer composite sheet metal material by shaping a tube and cutting the latter into a plurality of tube portions.

The round blanks or tube portions are then formed into semifinished products in the form of hollow bodies by a flow forming method, with the shielding layer (hydrogen barrier) also being deformed and expanded, but not interrupted, such that the shielding properties are retained 14. The respective semifinished product in the form of a hollow body substantially has a bottle-like form. It can already largely or approximately have the shape of the pressure vessel to be produced.

In a next working step, the semifinished product in the form of a hollow body is reinforced and for this purpose wrapped or encapsulated with reinforcing fibers 16. The reinforcing fibers consist of carbon, glass, basalt and/or aramid fibers, for example. The semifinished product can be encapsulated or wrapped with reinforcing fibers by being braided, for example. However, in alternate embodiments, other wrapping or encapsulating techniques may be utilized without departing from the scope of the present disclosure.

Then, the semifinished product encapsulated with reinforcing fibers is introduced into a combined RTM/hydroforming mold 18. This involves a closable casting mold for carrying out a resin injection method (Resin Transfer Molding=RTM), this mold being formed in such a manner that the encapsulated semifinished product is calibrated therein by hydroforming, i.e. by the application of an internal pressure by means of a liquid or a gas.

Before the internal pressure is applied or raised in the semifinished product, the reinforcing fibers enclosing the semifinished product are firstly pre-infiltrated or injected with thermosetting synthetic resin 18. In other words, thermosetting plastic resin may be injected in the casting mold to form a layer surrounding the semifinished product and encapsulate the reinforcing fibers within the layer of plastic resin. Thereafter, the internal pressure within the semifinished product (i.e. the hollow cavity within the semifinished product) is raised to a pressure above 500 bar, preferably above 1000 bar. As a result, the semifinished product is formed in a plastic state into the final geometry of the pressure vessel to be produced, with the pre-infiltrated reinforcing fibers being infiltrated completely with the synthetic resin as matrix material at the same time. The forming of the semifinished product into the final geometry of the pressure vessel to be produced also includes a proportion of an elastic change in shape (prestress). This prestress is maintained by relieving or releasing the internal pressure (then in the form of supporting pressure) only after the matrix material (synthetic resin) has been consolidated, or cured.

Figure 2:
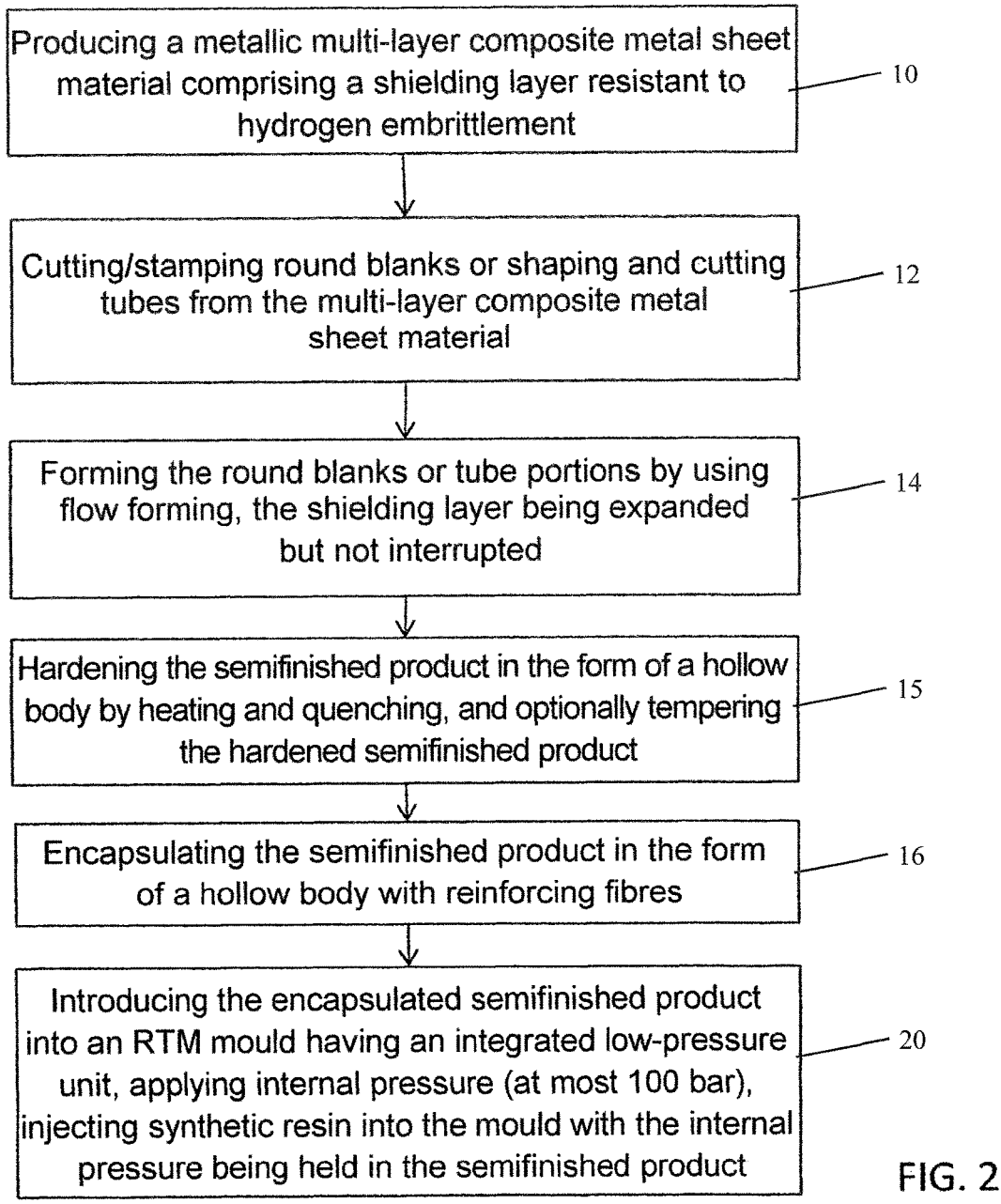
FIG. 2 is a flow chart depicting a sequence of steps in a second embodiment of a method of the present disclosure.

Referring to FIG. 2, a second exemplary embodiment of a method according to the present disclosure is shown. This embodiment differs from the first exemplary embodiment shown in FIG. 1 in that the semifinished product may be heat-treated 15 between the flow forming of the round blank produced from the multi-layer composite sheet metal or of the corresponding tube portion, and the encapsulation of the hollow body semifinished product with reinforcing fibers. The heat treatment results in the hardening of the hollow body semifinished product. The hardening is achieved by heating and rapidly cooling the hot semifinished product. The heating can be carried out, for example, in a furnace, in particular a batch-type annealing furnace or continuous furnace, or by means of an induction apparatus, in particular also selectively in a marginal layer of the semifinished product. To rapidly cool (quench) the heated semifinished product, the latter is immersed into a bath containing cooling liquid or sprayed with cooling liquid. If appropriate, the hardened semifinished product is subjected to a heat treatment, also referred to as tempering, before further processing.

Furthermore, the second exemplary embodiment of the method as shown in FIG. 2 differs from the first exemplary embodiment shown in FIG. 1 in that the heat-treated hollow body/semifinished product encapsulated with reinforcing fibers is introduced into a closable RTM mold (resin injection mold) having an integrated low-pressure unit 20. The low-pressure unit is used to subject the hollow space of the semifinished product, in the form of a hollow body, to a maximum internal pressure of at most 100 bar 20. For this purpose, a liquid or a gas is pumped into the hollow space of the semifinished product. An elastic prestress is thereby generated in the semifinished product. Then, the synthetic resin injection process is started, with the internal pressure being held. The elastic prestress is maintained by relieving the internal pressure (supporting pressure) only after the synthetic resin (matrix material) has been consolidated or cured. As an alternative to this, but also representative to all the other embodiments, before starting the synthetic resin injection process the internal pressure (support pressure) can be reduced, to that effect that the internal pressure is marginal, beneath the injection pressure in order to reduce the flow resistance of the synthetic resin while it is being injected. After the injection and complete wetting of the reinforcing fibers with the resin, the internal pressure is increased again in order to squeeze excessive synthetic resin out of the mold, and maintain an elastic prestress, wherein the internal pressure is relieved only after the synthetic resin has been consolidated or cured.

Figure 3:
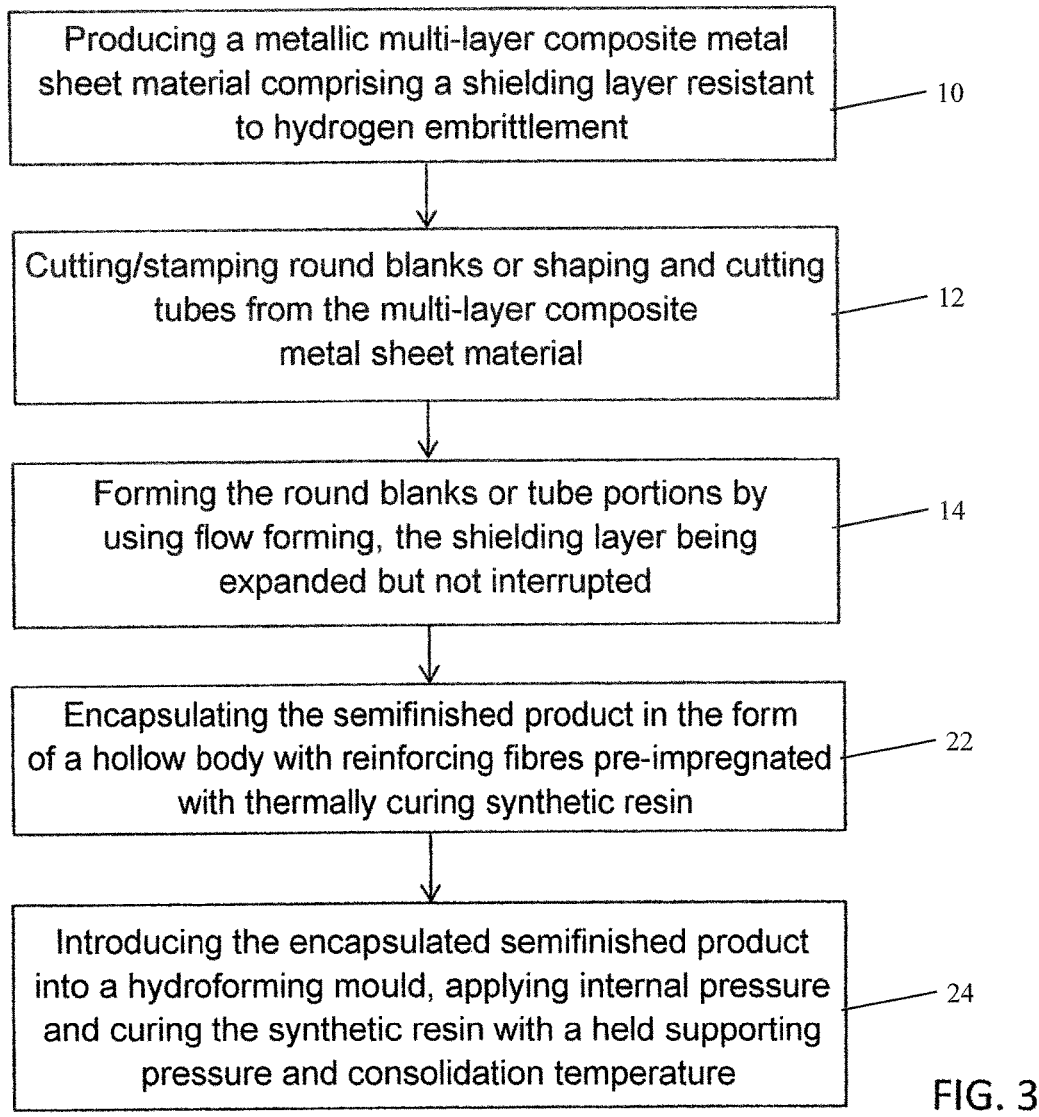
FIG. 3 is a flow chart depicting a sequence of steps in a third embodiment of a method of the present disclosure.

Referring to FIG. 3, a third exemplary embodiment of a method according to the present disclosure differs from the exemplary embodiment shown in FIG. 1, in that the semifinished product, or flow formed hollow body, is encapsulated with reinforcing fibers (e.g. carbon, glass, basalt and/or aramid fibers) which are already pre-impregnated with thermally curing synthetic resin 22. Pre-impregnated synthetic resin semifinished products (what are termed prepregs) can be used for this purpose. Alternatively, for this purpose it is also possible for continuous fibers to be guided through an impregnation bath containing liquid synthetic resin before the winding (encapsulation).

Then, the semifinished product encapsulated with the pre-impregnated reinforcing fibers is introduced into a hydroforming mold 24, in which the semifinished product is subjected to the application of an internal pressure of more than 500 bar, preferably more than 1000 bar, by means of a liquid or a gas. As a result, the semifinished product is formed and thus calibrated in a plastic state into the final geometry of the pressure vessel to be produced. The calibration includes a proportion of elastic forming (prestress), this being maintained by the synthetic resin of the pre-impregnated reinforcing fibers being cured at a held internal pressure (supporting pressure) and a sufficiently high consolidation temperature.

Figure 4:
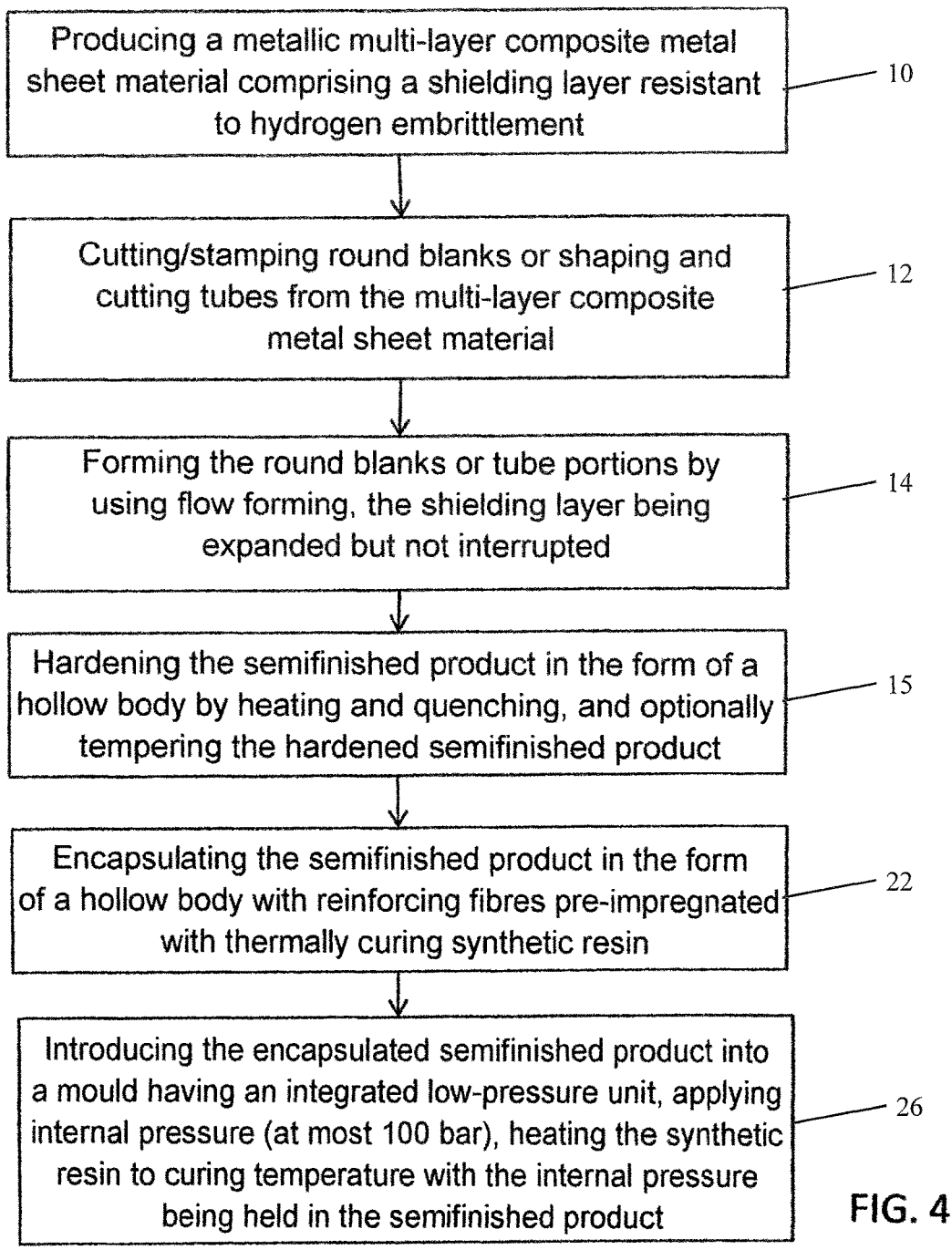
FIG. 4 is a flow chart depicting a sequence of steps in a fourth embodiment of a method of the present disclosure.

Referring to FIG. 4, a fourth exemplary embodiment of a method according to the present disclosure differs from the exemplary embodiment shown in FIG. 2 in that the semifinished product in the form of a hollow body which has been heat-treated 15 by hardening and, if appropriate, tempering, is encapsulated with pre-impregnated reinforcing fibers (e.g. carbon, glass, basalt and/or aramid fibers) 22. For this purpose, use can be made in turn of pre-impregnated semifinished products (prepregs). Alternatively, for this purpose it is also possible for an endless or continuous reinforcing fiber to be impregnated before the winding by the endless or continuous fiber being passed through an impregnation bath, respectively a "dry" fiber material is used for encapsulating.

Then, the heat-treated semifinished product encapsulated with reinforcing fibers is introduced into a closable mold having an integrated low-pressure unit 26. The low-pressure unit is used to pump or press liquid or gas into the hollow space of the semifinished product, such that the semifinished product is subjected to maximum pressure of at most 200 bar. An elastic prestress is thereby generated in the semifinished product. The elastic prestress is maintained by relieving the internal pressure (supporting pressure) only after the synthetic resin of the pre-impregnated reinforcing fibers has been cured. To cure the synthetic resin, the semifinished product is heated to the required curing temperature in the mold.

What is claimed is:

1. A method for producing a seamless pressure vessel for storing hydrogen, the method comprising:
   producing a multilayered composite sheet metal workpiece having at least a steel carrier layer, and a shielding layer that is resistant to hydrogen embrittlement;
   flow forming the multi-layer composite sheet metal workpiece into a seamless hollow body having an inner surface and an outer surface, the shielding layer being the inner surface layer thereof, said seamless hollow body configured to be used as at least a part of a pressure vessel;
   encapsulating the seamless hollow body with one or more reinforcing fibers, wherein the reinforcing fibers are pre-infiltrated with thermosetting plastic;
   inserting the seamless hollow body into a mold;
   while in the mold, pressurizing the seamless hollow body to an internal pressure of more than 500 bar so as to cause the thermosetting plastic to impregnate the reinforcing fibers and the seamless hollow body to plastically form to the final geometry of the pressure vessel; and
   releasing the internal pressure after the plastic has cured such that an elastic prestress is generated in the seamless hollow body.

2. The method of claim 1, further comprising:
   heating the seamless hollow body; and
   quenching the seamless hollow body in a quenching liquid so as to heat treat and harden the seamless hollow body, wherein the carrier layer of the multilayered composite sheet metal workpiece is hardenable steel.

3. The method of claim 2, wherein the seamless hollow body that has been heat treated and hardened has a low hardness after heat treating.

4. The method of claim 1, wherein the one or more reinforcing fibers are at least one of a dry reinforcing fiber, or a reinforcing fiber pre-impregnated with one or more of a thermosetting or thermally curable plastic.

5. The method of claim 4, wherein said encapsulating step includes:
   passing at least one continuous fiber through an impregnation bath containing thermally curable synthetic resin; and
   winding the at least one continuous fiber around the seamless hollow body.

6. The method of claim 1, wherein the one or more reinforcing fibers include at least one of a dry reinforcing fiber fabric, or a reinforcing fiber fabric pre-impregnated with one or more of a thermosetting or thermally curable plastic.

* * * * *